United States Patent Office 3,419,101
Patented Dec. 31, 1968

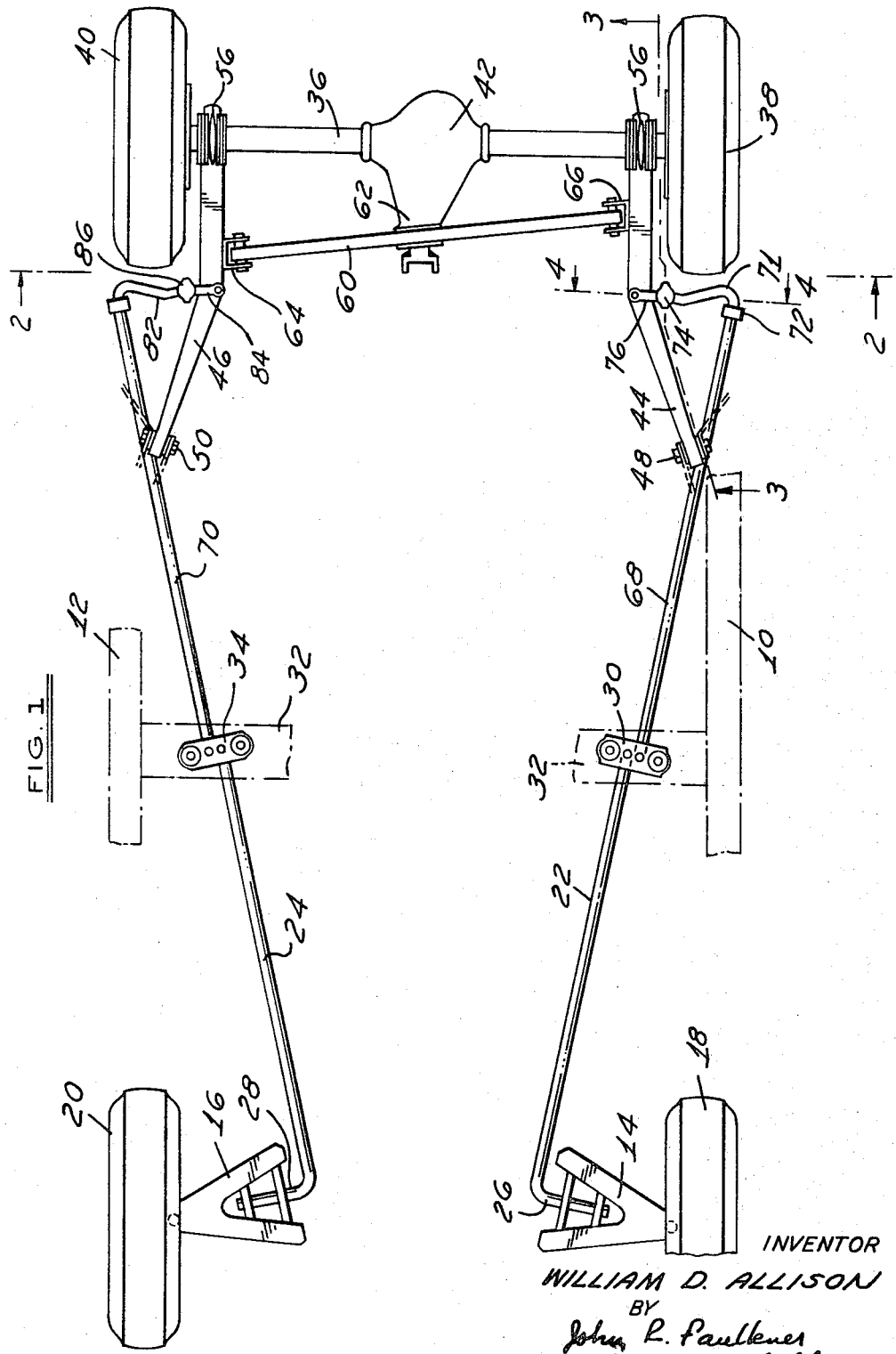

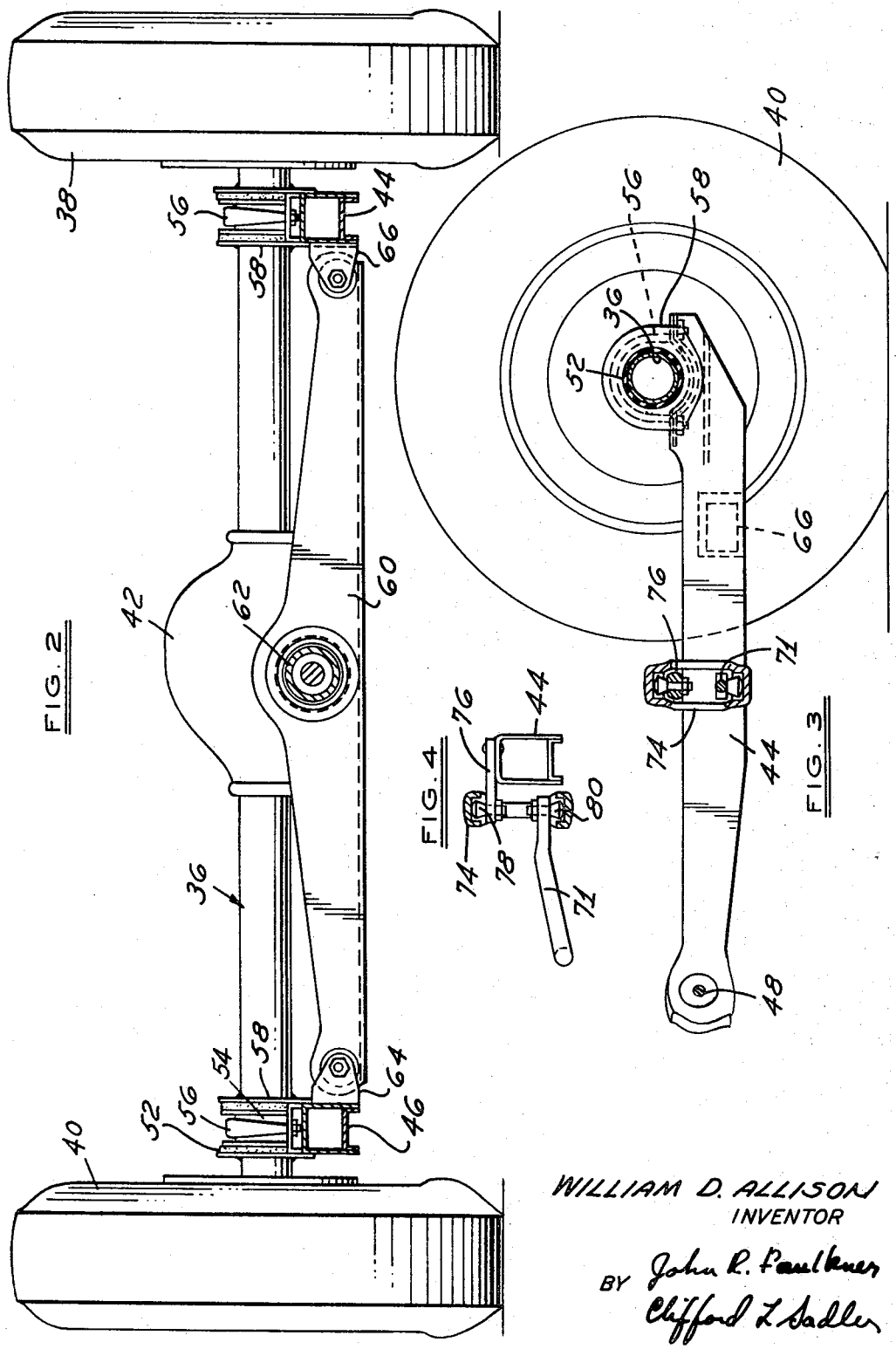

3,419,101
INTERCONNECTED VEHICLE SUSPENSION HAVING REAR TRAILING ARMS
William D. Allison, Grosse Pointe Farms, Mich., assignor to Ford Motor Company, Dearborn, Mich., a corporation of Delaware
Filed Mar. 23, 1967, Ser. No. 625,355
10 Claims. (Cl. 180—73)

ABSTRACT OF THE DISCLOSURE

A vehicle suspension system having a pair of driving wheels, an axle housing and a pair of trailing suspension arms connecting the housing to the vehicle chassis. A transverse balancing lever is pivotally connected to the differential portion of the axle housing and to the suspension arms. The lever is angled to the axis of the axle housing in order to balance torque reaction and equalize traction between the driving wheels during acceleration.

Background of the invention

The present invention is an improvement in the limited interconnected suspension system described in my copending application entitled "Vehicle Variable Independent Suspension System," Ser. No. 544,756, filed Dec. 25, 1966, and since issued as Patent No. 3,386,751. More particularly, the present invention presents an improvement in the rear suspension construction for a vehicle having a limited interconnected suspension system of the type described in that patent.

Brief summary of the invention

In accordance with the preferred embodiment of the present invention, a vehicle has front and rear torsion bars interconnected on the left and right sides of the vehicle. The front torsion bars are connected to the front suspension system. The rear torsion bars are connected to a rear suspension which is of a unique type. The torsion bars are interconnected so that a portion of the forces at one wheel will be transmitted to the adjacent wheel on the same side of the vehicle. It is intended that the connection between the front and rear bars be of the type described in my application Ser. No. 544,756 mentioned above.

The rear suspension system includes a rigid axle housing that extends from wheel to wheel. A pair of trailing arms are pivotally connected to the frame of the vehicle and secured to the axle housing. A balancing lever is pivotally connected to the differential housing situated in the middle of the axle housing. The outer ends of the balancing lever are pivotally connected to the trailing arms. The balancing lever is angled in order to equalize forces on the wheels during acceleration.

A vehicle having a suspension according to this invention will exhibit superior ride and handling characteristics. The suspension is noted for its simplicity and ease of manufacture.

Brief description of the drawings

The many objects and advantages of the present invention will become apparent upon consideration of the following discussion and the accompanying drawings, in which:

FIGURE 1 is a top plan view of a motor vehicle having a limited interconnected suspension system and rear suspension linkage constructed in accordance with the present invention;

FIGURE 2 is a front elevational view of a portion of the rear suspension of FIGURE 1;

FIGURE 3 is a side elevational view of a trailing suspension arm and associated rear suspension components; and FIGURE 4 is a sectional view taken along section lines 4—4 of FIGURE 1 and disclosing a detailed view of the connection between the torsion bar and the trailing suspension arm.

Detailed description of the invention

Referring now to the drawings for a more detailed description of the present invention, attention is directed to FIGURE 1 which discloses a top plan view of a vehicle having a limited interconnected suspension of the general type described in my earlier filed patent application Ser. No. 544,756 referred to above. In the construction of FIGURE 1, the vehicle has a chassis frame structure that includes left and right side rails 10 and 12. At the front of the vehicle, the chassis frame is supported by a conventional independent suspension system which includes upper and lower suspension arms that are pivotally connected to the side rails 10 and 12 or other chassis components. The upper suspension arms are designated by reference numerals 14 and 16. Front road wheels 18 and 20 are situated at the outer ends of the suspension arms 14, 16 and are connected thereto by wheel spindles not shown.

The vehicle chassis is supported on the road wheels at the front of the vehicle by means of left and right torsion bars 22 and 24 which have their forward ends bent at an angle to form lever arm portions 26 and 28, respectively. The lever arm portion 26 for the left bar 22 is connected to the upper suspension arm 14. Similarly, the bent lever arm portion 28 of the right bar 24 is connected to the right upper suspension arm 16. The rear end of the left bar 22 is secured to a mounting bracket 30 that is connected to a cross frame member 32 interconnecting the side rails 10 and 12. A like mounting bracket 34 is connected to the cross member 32 and receives the rear end of the right front torsion bar 24.

At the rear of the vehicle, a rigid axle housing 36 has left and right road wheels 38 and 40 journalled at its ends. A housing 42 is interposed in the center of the axle housing 36 and contains differential gearing for the transmission of driving torque to the wheels 38 and 40.

Left and right trailing arms 44 and 46 position the axle housing 36 with respect to the vehicle frame. The arms 44 and 46 are pivotally connected at 48 and 50, respectively, to the frame side rails 10 and 12. The rear ends of the arms 44 and 46 are clamped to the axle housing 36. A rubber layer 52 is positioned about the axle by a metal cap 54. A U-bolt 56 surrounds the cap and clamps the axle 36 to the arm. The rear end of the trailing arms 44 and 46 have bracket structure 58 to retain the rubber elements 52 and to receive the U-bolts 56.

The rear portions of the trailing arms 44 and 46 are generally parallel and extend directly forwardly from the axle housing 36. At a point forwardly of the wheels 38 and 40, the arms 44 and 46 are angled outwardly to their attachments 48 and 50 with the side rails 10 and 12.

A balancing lever 60 is journalled at the forward nose of the differential housing 42. The portion of the differential 42 supporting the balancing lever 60 is indicated by the reference numeral 62. The right end of the balancing lever 60 is pivotally connected to a bracket 64 that is welded to the right suspension arm 46. A bracket 66 is welded to the left arm 44 and pivotally supports the left extremity of the balancing lever 60. As seen in FIGURE 1, the balancing lever 60 is positioned at an angle to a transverse line (such as the axis of the axle 36) so that the pivot bracket 64 is closer to the frame bracket 50 than the pivot bracket 66 is to the frame bracket 48 supporting the arm 44. The purpose in angling the lever 60 will be described later.

The chassis is supported on the rear suspension system by left and right torsion bars 68 and 70. The left torsion bar 68 has its forward end connected to the frame bracket 30. The rear end of the bar 68 has an integrally formed lever portion 71 that is braced on the frame rail 10 at point 72. The lever arm portion 71 of the bar 68 is directed inwardly and is linked to the trailing suspension arm 44 by means of a shackle 74 as illustrated in FIGURES 3 and 4.

The arm 44 has a bracket member 76 that is riveted thereto and extends outwardly therefrom. Rolling contact bearings are provided for connecting the bracket 76 of the arm 44 with the lever arm 71 of torsion bar 44.

A member 78 having a spherical surface is positioned within the shackle 74 and secured to the bracket 76. A bearing 80 is connected to the trip of the lever arm 71. It also has a spherical bearing surface. The shackle 74 has a generally rectangular shape with a cup-shaped pocket positioned at either end into which the bearing members 78 and 80 may be positioned. The link 74 is loaded in tension to transmit spring forces from the bar 68 to the arm 44.

The right rear torsion bar 70 is connected to the frame mounted bracket 34 at its forward end. The rear end of the bar 70 is angled inwardly to form a lever arm 82 that is joined to a bracket member 84 riveted to arm 46. A tension shackle 86, similar in construction to shackle 74, joins the end of the lever arm portion 82 of the bar 70 with the trailing suspension arm 46.

The rolling contacts illustrated in FIGURES 3 and 4 connecting the suspension arms 46, 44 with the torsion bars 68 and 70 are employed to reduce friction. The bearing surfaces provided on the inner surface of the shackles 74 and 86 are substantially flat. The bearings on the suspension arm brackets 76, 84 and on the ends of the lever arm portions 71, 82 present spherical surface for single point rolling contact engagement with the flat surfaces of the shackles 74, 86. The bearing surfaces are hardened for durability and do not require lubrication.

As previously noted, the rear end of bar 22 and the forward end of bar 68 are connected to the common bracket 30 which, in turn, is supported on the frame cross member 32. Similarly, the bars 24 and 70 are connected to the common frame mounted bracket 34. It is intended that the brackets 30 and 34 be mounted on the frame cross member 32 by means of resilient devices so that forces will be transmitted, at least in part, from one bar to the other bar and only a portion of the forces will be transferred into the vehicle frame. The connection between the front and rear torsion bars, the construction of the brackets 30, 34 and the mounting of this structure on the cross member 32 may be of the type illustrated and described in my previously mentioned pending patent application Ser. No. 544,756. In that application, the full function of this mechanism is set forth.

In summary, the axle housing 36 is located transversely by the frame pivots 48, 50 and the truss like construction of the suspension assembly, that is, the bracing provided by the angled balancing lever 60.

The desired amount of lateral compliance under lateral load may be obtained by proper design of the resilient bushings and other components. The trailing arms 44, 46 are splayed outwardly and angled downward toward the front in order to obtain steer characteristics from lateral compliance and body roll. The advantages of using a suspension construction providing lateral compliance are described in my Patent 3,259,201 issued July 5, 1966 and entitled "Linkage Type Rear Suspension System" as well as in my Patent 3,171,642 issued Mar. 2, 1965 and entitled "Vehicle Wheel Suspension Having Lateral Compliance."

The angular position of the balancing lever 60 results in unequal vertical forces at the trailing arm chassis pivots 48, 50 during acceleration and deceleration. The objective of the unequal loading is to reduce torque steer and to provide more nearly equal traction between the rear wheels during acceleration.

In the conventional rear suspension system in which the arms are symmetrically arranged, the torque reaction of the rotating drive shaft will cause an increase in the loading of the right rear wheel. As a result, the left and right wheels will have unequal traction and the left wheel may slip during acceleration due to its reduced loading. The angled mounting of the balancing lever 60 prevents this occurring.

The foregoing description constitutes the presently preferred embodiment of this invention.

I claim:

1. A rear suspension system for a motor vehicle having a vehicle chassis, a pair of rear driving wheels, rigid axle housing means extending between said wheels and rotatably supporting said wheels, a differential gear unit interposed in said axle housing means and constructed to deliver driving torque to said wheels, a pair of suspension arms pivotally connected to said chassis and secured to said axle housing means, a balancing lever pivotally connected to said axle housing means, first pivot means connecting one end of said lever to one of said suspension arms and second pivot means connecting the other end of said lever to the other of said suspension arms, said balancing lever being inclined at an angle to the transverse axis of said axle housing whereby one end of said balancing lever is rearwardly of the other end of said lever.

2. A suspension system for a motor vehicle according to claim 1 and including:
resilient means interposed between said suspension arms and said axle housing means and constructed to permit limited movement between said axle housing means and said suspension arms.

3. A suspension system for a motor vehicle according to claim 1 and including:
a pair of front road wheels, left and right suspension means connecting said road wheels to said chassis, left and right front torsion bars having their forward ends connected to said suspension means, left and right rear torsion bars connected to said suspension arms at their rear ends and to said front torsion bars at their forward ends.

4. A suspension system for a motor vehicle according to claim 1 and including:
a pair of front road wheels, left and right suspension means connecting said road wheels to said chassis, left and right front torsion bars having their forward ends connected to said suspension means, left and right rear torsion bars connected to said suspension arms at their rear ends and to said front torsion bars at their forward ends, resilient means interposed between said suspension arms and said axle housing means and constructed to permit limited movement between said axle housing means and said suspension arms.

5. A rear suspension system for a motor vehicle having a vehicle chassis, a pair of rear driving wheels, rigid axle housing means extending between said wheels and rotatably supporting said wheels, a differential gear unit interposed in said axle housing means and constructed to deliver driving torque to said wheels, a pair of suspension arms having their forward ends pivotally connected to said chassis and their rearward ends secured to said axle housing means, a balancing lever pivotally connected to said axle housing means, first pivot means connecting one end of said lever to one of said suspension arms and second pivot means connecting the other end of said lever to the other of said suspension arms, said balancing lever being positioned forwardly of said axle housing means.

6. A suspension system for a motor vehicle according to claim 5 and including:
resilient means interposed between said suspension arms and said axle housing means and constructed to permit limited movement between said axle housing means and said suspension arms.

7. A suspension system for a motor vehicle according to claim 5 and including:

a pair of front road wheels, left and right suspension means connecting said road wheels to said chassis, left and right front torsion bars having their forward ends connected to said suspension means, left and right rear torsion bars connected to said suspension arms at their rear ends and to said front torsion bars at their forward ends.

8. A suspension system for a motor vehicle according to claim 5 and including:

said balancing lever being inclined at an angle to the transverse axis of said axle housing whereby one end of said balancing lever is rearwardly of the other end of said lever.

9. A suspension system for a motor vehicle according to claim 5 and including:

said balancing lever being inclined at an angle to the transverse axis of said axle housing whereby one end of said balancing lever is rearwardly of the other end of said lever, resilient means interposed between said suspension arms and said axle housing means and constructed to permit limited movement between said axle housing means and said suspension arms.

10. A suspension system for a motor vehicle according to claim 5 and including:

a pair of front road wheels, left and right suspension means connecting said road wheels to said chassis, left and right front torsion bars having their forward ends connected to said suspension means, left and right rear torsion bars connected to said suspension arms at their rear ends and to said front torsion bars at their forward ends, said balancing lever being inclined at an angle to the transverse axis of said axle housing whereby one end of said balancing lever is rearwardly of the other end of said lever.

References Cited
UNITED STATES PATENTS

| | | |
|---|---|---|
| 2,582,775 | 1/1952 | Giacosa. |
| 3,194,336 | 7/1965 | McHenry _____ 180—73 |

A. HARRY LEVY, *Primary Examiner.*

U.S. Cl. X.R.

280—104